(12) United States Patent
Treit et al.

(10) Patent No.: US 8,844,042 B2
(45) Date of Patent: Sep. 23, 2014

(54) SYSTEM STATE BASED DIAGNOSTIC SCAN

(75) Inventors: Randal P. Treit, Monroe, WA (US);
Joseph J. Johnson, Seattle, WA (US);
Adrian Marinescu, Sammamish, WA
(US); Nitin Sood, Redmond, WA (US);
Marc E. Seinfeld, Fort Lauderdale, FL
(US)

(73) Assignee: Microsoft Corporation, Redmond, WA (US)

( * ) Notice: Subject to any disclaimer, the term of this patent is extended or adjusted under 35 U.S.C. 154(b) by 330 days.

(21) Appl. No.: 12/816,567

(22) Filed: Jun. 16, 2010

(65) Prior Publication Data

US 2011/0314543 A1 Dec. 22, 2011

(51) Int. Cl.
*G06F 21/00* (2013.01)
*G06F 21/57* (2013.01)

(52) U.S. Cl.
CPC .................................. *G06F 21/577* (2013.01)
USPC ............................................ 726/25; 713/187

(58) Field of Classification Search
USPC ......................................................... 726/25
See application file for complete search history.

(56) References Cited

U.S. PATENT DOCUMENTS

2002/0104014 A1* 8/2002 Zobel et al. .................... 713/200
2004/0088115 A1 5/2004 Guggari et al.
2006/0294589 A1* 12/2006 Achanta et al. .................. 726/24
2007/0028303 A1 2/2007 Brennan
2009/0044024 A1* 2/2009 Oberheide et al. ............. 713/188
2009/0265139 A1 10/2009 Klein et al.
2010/0043004 A1* 2/2010 Tambi et al. .................. 718/103
2010/0063855 A1 3/2010 Nguyen

OTHER PUBLICATIONS

The Change Analysis Diagnostic tool for Windows XP is available—Published Date: May 29, 2007 http://support.microsoft.com/kb/924732.
Citrix Health Check Agent—Published Date: Aug. 30, 2005 http://support.citrix.com/article/CTX107531.
PC Check PC Diagnostic Software / PC Diagnostics Computer Diagnostic Software—Published Date: 2008 http://www.trainingplanet.com/html/novell_cne_training.htm.

* cited by examiner

*Primary Examiner* — Yogesh Paliwal
(74) *Attorney, Agent, or Firm* — Henry Gabryjelski; Kate Drakos; Micky Minhas

(57) ABSTRACT

In some embodiments, a local agent on a target system may evaluate current and/or historical system state information from a store (either local or remote) and dynamically adjust the level of diagnosis performed during the scan based on the evaluated state information. Individual diagnostic scans may, for example, be enabled and disabled based on the context in the store, and each scan may update the context for further evaluation. By employing such an approach, systems with a low risk profile and lacking symptoms of a problem may be scanned quickly while systems that show signs of a problem or have a high risk profile may receive a more thorough evaluation.

19 Claims, 4 Drawing Sheets

SYSTEM STATE BASED DIAGNOSTIC SCAN

BACKGROUND

Software designed to scan a computer system to determine whether it is in a good state must often make trade-offs between performance and thoroughness. Typically, the more thorough the scan, the longer it will take to perform and the more impact it will have on the system. Routine system scanning is generally expected to be fast and unobtrusive. Detecting sophisticated problems with a system, such as infection by a low-level rootkit malware program, however, may require deeper system checks that can negatively impact system performance.

Current solutions typically provide for only two levels of regularly scheduled system checking: a "quick scan" which minimizes impact to the system but is not thorough, and a "full scan" which is thorough but has significant impact.

There exists a need for a solution that is more effective at uncovering and alerting users to system issues than a typical quick scan without necessarily incurring the performance cost of a full scan.

SUMMARY

In some embodiments, a system comprises a scan context store configured to store scan context information for a computer system, and a software agent, residing on the computer system, that is configured to adjust a level of diagnosis performed during a scan based upon an evaluation of the context information stored in the scan context store.

In some embodiments, the software agent may, for example, comprise a scan context evaluator module configured to selectively enable respective diagnostic scans based upon the evaluation of the stored scan context information. In some embodiments, the software agent may additionally comprise a diagnostic scans module configured to perform enabled ones of the respective diagnostic scans, and a scan result evaluator module configured to modify the stored scan context information based upon results of the performed scans.

In some embodiments, the software agent may additionally or alternatively comprise a scan context evaluator module configured to evaluate the scan context information against a set of known rules to determine whether a particular type of scan is warranted, and to enable the particular type of scan only if it is determined that the particular type of scan is warranted.

In some embodiments, the system may further comprise at least one application configured to modify the scan context information stored in the scan context store to include information concerning its state.

In some embodiments, a method for evaluating a computer system comprises adjusting a level of diagnosis performed during a scan based upon an evaluation of stored scan context information. In some embodiments, one or more computer-readable storage mediums may be encoded with instructions that, when executed by one or more processors, cause the one or more processors to perform such a method. Such an adjustment may be performed, for example, by selectively enabling respective diagnostic scans based upon the evaluation of the stored scan context information. In some embodiments, after performing enabled ones of the respective diagnostic scans, the stored scan context information may be adjusted based upon the results of the performed scans.

In some embodiments, the scan context information may be evaluated against a set of known rules to determine whether a particular type of scans is warranted, and the particular type of scan may be enabled only if it is determined that the particular type of scan is warranted based upon the evaluation of the scan context information.

In some embodiments, the stored scan context information may comprise information about a current state of the computer system and information about a past state of the computer system.

In some embodiments, the stored scan context information may be modified to include information concerning a state of at least one application on the computer system. Additionally or alternatively, in some embodiments, the stored scan context information may be modified to include state information determined by a cloud service based upon an evaluation of at least one scan result.

In some embodiments, an agent running on a local system may be capable of invoking a series of system checks based on stored information about the current and past state of the system.

In some embodiments, a persisted store of contextual state information may be provided that can be read and updated by multiple agents. Such a store may exist locally on the system, or remotely on another system, or in the cloud.

In some embodiments, a process may be performed wherein available diagnostic scans are evaluated and prioritized based on rules applied to stored system context information.

In some embodiments, rules that determine which diagnostic scans will run given a particular system state profile may be dynamically updated.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

In some embodiments of the present invention, the behavior of performing a system scan may be modified from a static set of actions that are performed during a scan to a set of diagnostic scans that may be turned on or off at runtime based on evaluation of state information stored about the system to be scanned.

Figure 1:
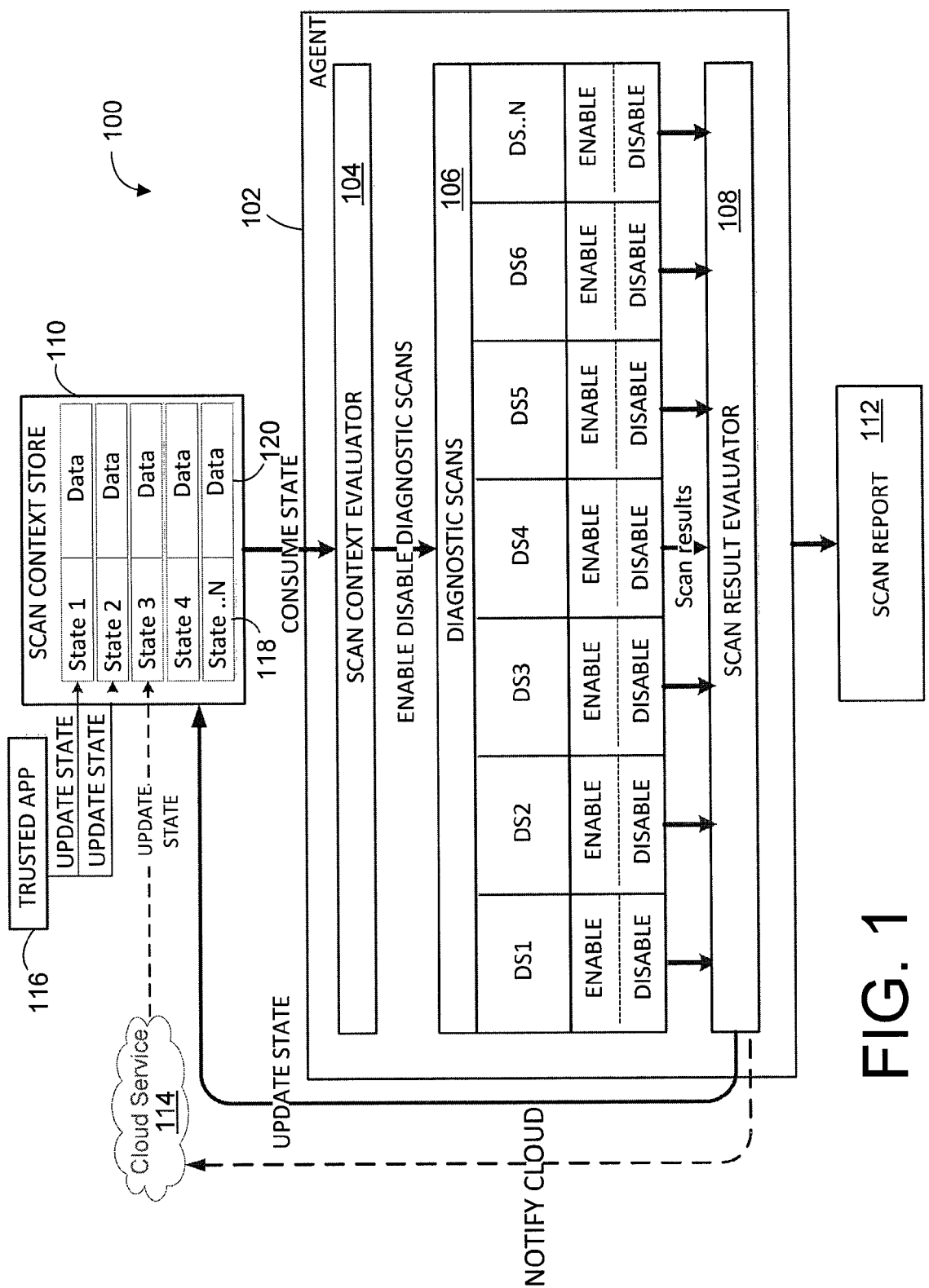
FIG. 1 is a functional block diagram of an illustrative example of a diagnostic system embodying certain aspects of the present invention.

FIG. 1 is a functional block diagram of an illustrative example of a diagnostic system 100 embodying certain aspects of the invention. The illustrated components of the diagnostic system 100 may, for example, represent software modules residing in memory of one or more computers. As shown, in some embodiments, an agent 102 running on a computer system (not shown) may be invoked to check the health of the system. In the illustrative example shown, the agent 102 comprises a scan context evaluator module 104, a diagnostic scans module 106, and a scan result evaluator module 108.

The diagnostic scans module 106 may, for example, be capable of performing various autonomous checks (e.g., individual diagnostic scans DS1-DSN) of the computer system. Each such diagnostic scan may, for example, perform a series of actions to examine some particular aspect of the computer system and provide one or more results of that examination to the scan result evaluator module 108 for processing. In some embodiments, each of the diagnostic scans may run independently of the others.

The scan result evaluator module 108 may, for example, evaluate the output of individual diagnostic scans and update the scan context store 110 (described below), as needed. The scan result evaluator module 108 may, for example, determine whether the scan results received from the diagnostic scans module 106 are conclusive enough to make a declaration about the health state of the computer system, or whether additional information is needed. In some embodiments, if the scan result evaluator module 108 determines that additional information is needed, then additional diagnostic scans DS1-DSN may be enabled and run, and the scan context evaluator module 104 may re-evaluate the system state until the agent 102 determines that the health of the computer system can be asserted.

The scan context evaluator module 104 may, for example, be responsible for performing a runtime evaluation of which diagnostic scans to enable or disable for a particular system scan. Such an evaluation may be achieved, for example, by examining the contents of a scan context store 110 in which system state information, known as "scan context," may be persistently stored. The scan context may, for example, represent known information about the computer system at runtime, and the scan context evaluator module 104 may evaluate the scan context against a set of known rules. In some embodiments, this information may be updated frequently, so that the context of the scan may change from one system scan to the next.

As respective diagnostic scans (e.g., DS1-DSN) are run, the agent 102 may update the scan context maintained in the scan context store 110 with the information gathered from the diagnostic scan and re-evaluate the need for additional diagnostic scans based on the updated scan context. In some embodiments, this process may be repeated until no diagnostic scans are enabled, at which time the system scan may end and the agent 102 may provide results of the system scan to a scan report module 112. In some embodiments, the scan report module 112 may, for example, prepare and present final results of the system scan after all diagnostic scans have run and a determination has been made that no additional scans are needed.

As noted above, in some embodiments, the scan context store 110 may store system state information that provides context for the scan at runtime. The scan context store 110 may take on any of numerous forms and be located in any of numerous locations with respect to the agent 102, and the invention is not limited to a store of any particular type or configuration. In some embodiments, for example, the scan context store 110 may exist locally on the system being scanned (e.g., on a hard drive and/or in random access memory (RAM)). In other embodiments, it may be located remotely, e.g., on a server, or may be in the cloud. In some embodiments, the scan context store 110 may be updated by the agent itself and/or by one or more trusted applications 116 or other components that have information which is relevant to the context of the scan to be performed. In some embodiments, the scan context store 110 may be persisted across reboots of the computer system. In the example shown, the scan context store 110 contains a set of name-value pairs, with each name 118 identifying a state type with which the linked data value 120 corresponds.

In some embodiments, one or more of the engines that are used to perform respective diagnostic scans may employ a "local" store containing the scan context information used by that particular engine. Such local stores may, for example, be created at the time particular engines are invoked based upon the data contained in a "global" scan context store 110. In some embodiments, once such an engine has completed its operation, any modifications made to the engine's local store may be merged into the global scan context store 110. In some embodiments, the global scan context store 110 may reside in persistent memory and the local stores for respective engines may reside in RAM.

In certain embodiments, the scan context store 110 may additionally or alternatively be updated by one or more cloud services 114 that may, for example, have additional context that is not available on the computer system. For example, in some embodiments, the scan result evaluator module 108 may notify a cloud service 114 of current scan information, and the cloud service 114 may respond by writing additional state information in the scan context store 110. In some embodiments, for example, a cloud service 114 may compare a determined profile for the scanned computer system to profiles of other computer systems known to have particular health issues. Such a cloud service 114 may then update a state entry in the scan context store 110 accordingly if a matching or similar profile is found. Thereafter, the scan context evaluator module 104 may enable one or more appropriate diagnostic scans to examine the computer system for those particular health issues. Accordingly, in some embodiments, use of a cloud service 114 may provide a mechanism for automated or human analysts to dynamically request additional scan behavior by updating the scan context store 110 based upon current system state information received by the service 114.

In some embodiments, the rules employed by the scan context evaluator module 104 to evaluate the scan context and determine which scans to turn on or off may be dynamically updatable, such as through a cloud service 114 that supplies new versions of the rules (e.g., "signatures") on a daily basis.

In some embodiments, by determining which diagnostic scans to enable or otherwise adjusting the system scan behavior based on the stored scan context and system state information, the performance of the scan may be greatly optimized for a computer system whose state is healthy. For a computer system whose state is unhealthy, a much deeper scan may be performed and the ability to successfully diagnose problems with the system may be greatly enhanced. Accordingly, in some embodiments, rather than having to make a trade-off between performance and effectiveness and defining a system scan as a set of static actions, the agent 102 may be able to fine-tune the scan and make those tradeoff decisions at runtime.

Figure 2:
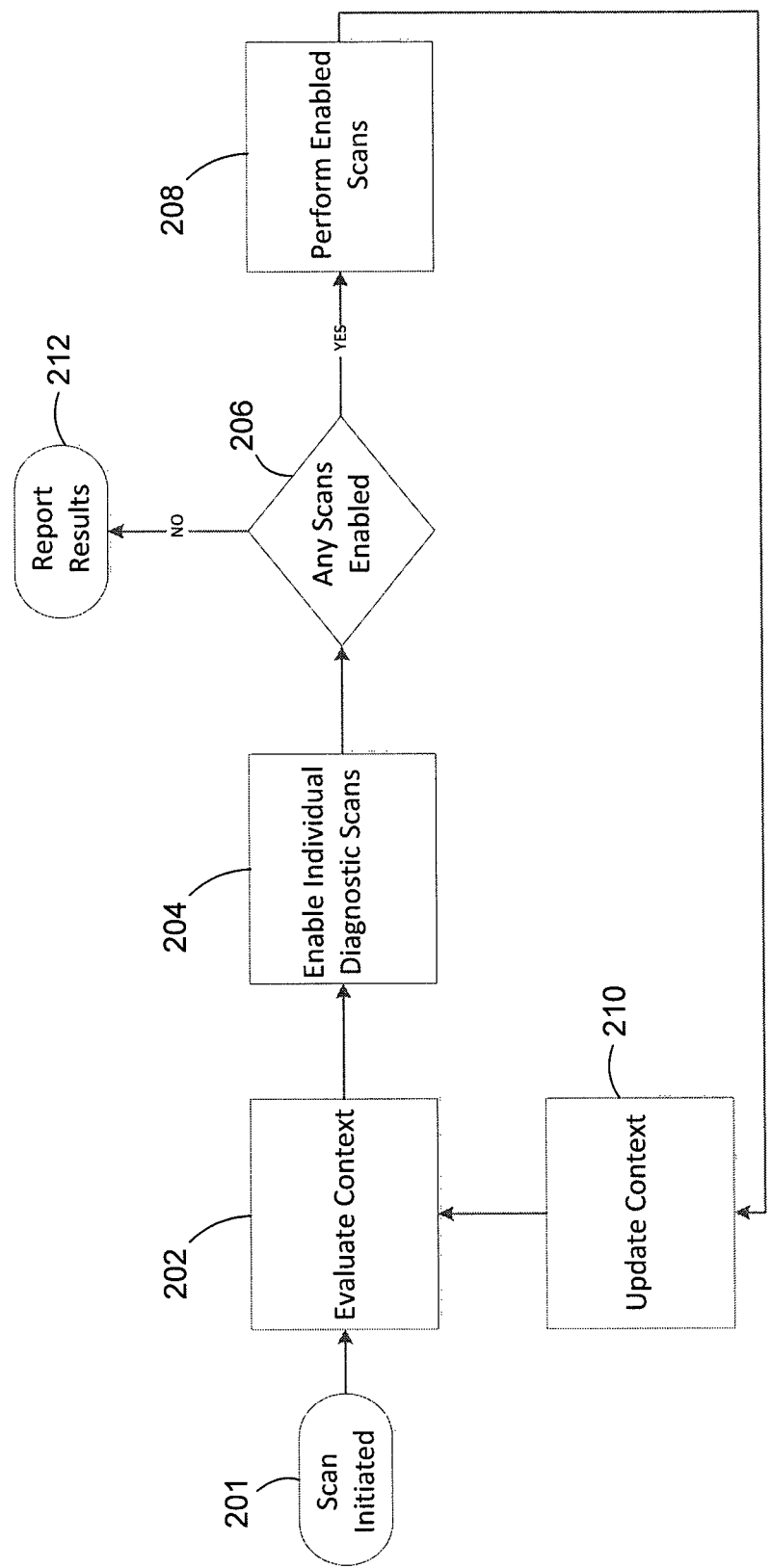
FIG. 2 is a flow chart of an illustrative example of an algorithm that may be performed by a software agent in accordance with some embodiments of the invention.

FIG. 2 is a flow chart of an illustrative example of an algorithm 200 that may be performed by the agent 102 in accordance with some embodiments of the invention. The illustrated routine may, for example, be executed by one or more processors of the computer system that is being evaluated. In some embodiments, the agent 102 may be embodied as a set of instructions stored in a computer-readable medium accessible by the processor(s) of the subject computer system.

As shown in FIG. 2, when a scan is initiated (step 201), the scan context may be evaluated (e.g., using the scan context evaluator module 104) against a known set of rules (step 202), and, based upon that evaluation, individual diagnostic scans (e.g., scans DS1-DSN) may be enabled or disabled (step 204). Any of a number of conditions may cause the initiation of a scan. In some embodiments, for example, a scan may be initiated periodically, e.g., once an hour, once a day, once a week, etc. Additionally or alternatively, a scan may be initiated in response to some event experienced by the computer system, such as receipt of a particular type of file or communication, access of a particular type of resource, installation of a new application, etc.

If one or more individual diagnostic scans have been enabled (see step 206), then such enabled scans may be performed (e.g., by the diagnostic scans module 106) (step 208), and the scan context in the scan context store 110 may be updated based upon the results of those scans (step 210). As illustrated, in some embodiments, this process may be iterated until it is determined (at step 206) that no individual diagnostics scans are enabled. Once it is determined that none of the individual diagnostics scans are enabled (see step 206), then a scan report may be generated (e.g., by the scan report module 112) and the results may be reported, as appropriate (step 212).

Figure 3:
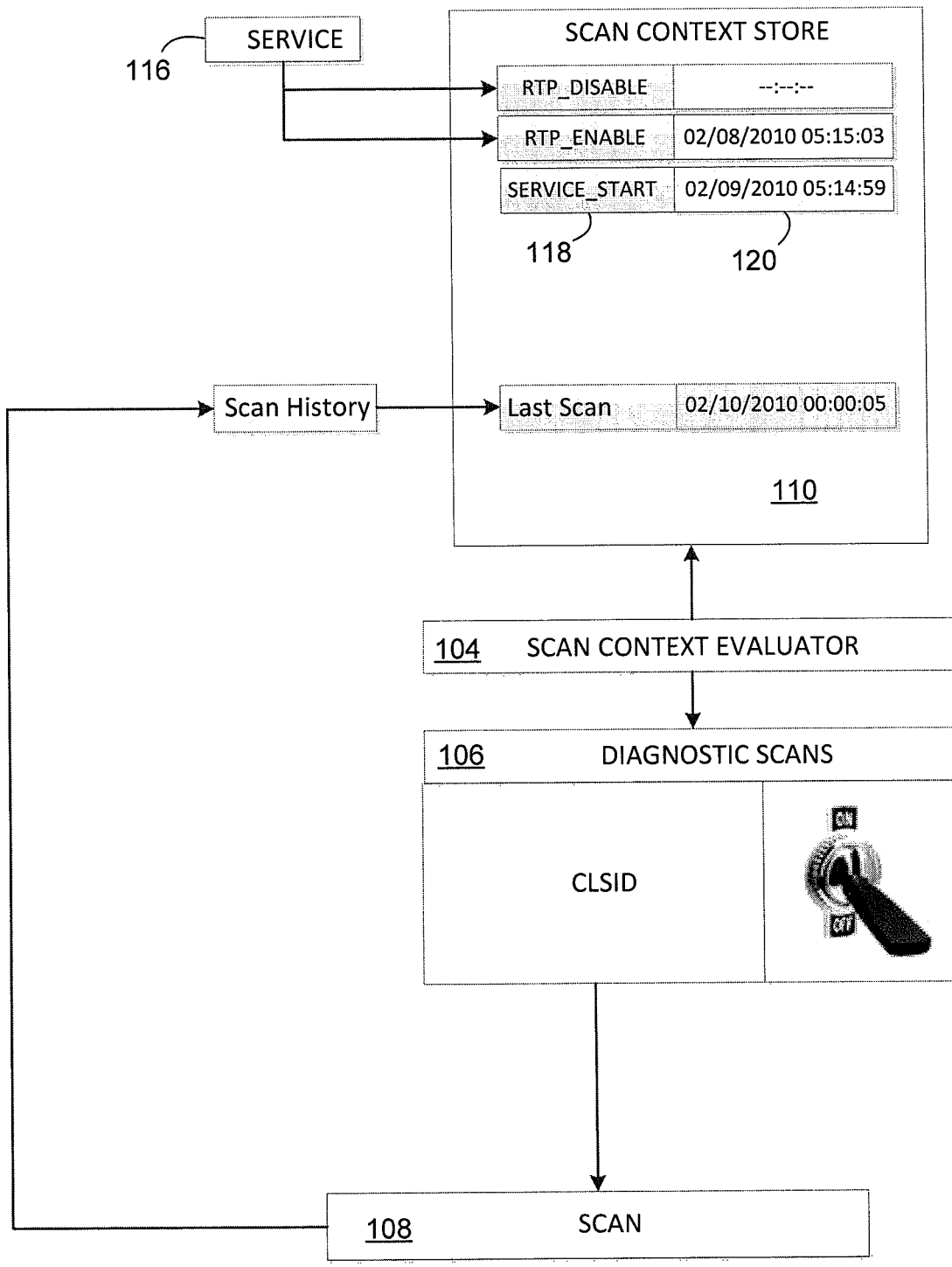
FIGS. 3 and 4 are functional block diagrams showing illustrative examples of individual scan types that may be selectively enabled in some embodiments, as well as examples of scan context information that may be examined to determine whether such scans should be enabled or disabled.
Figure 4:
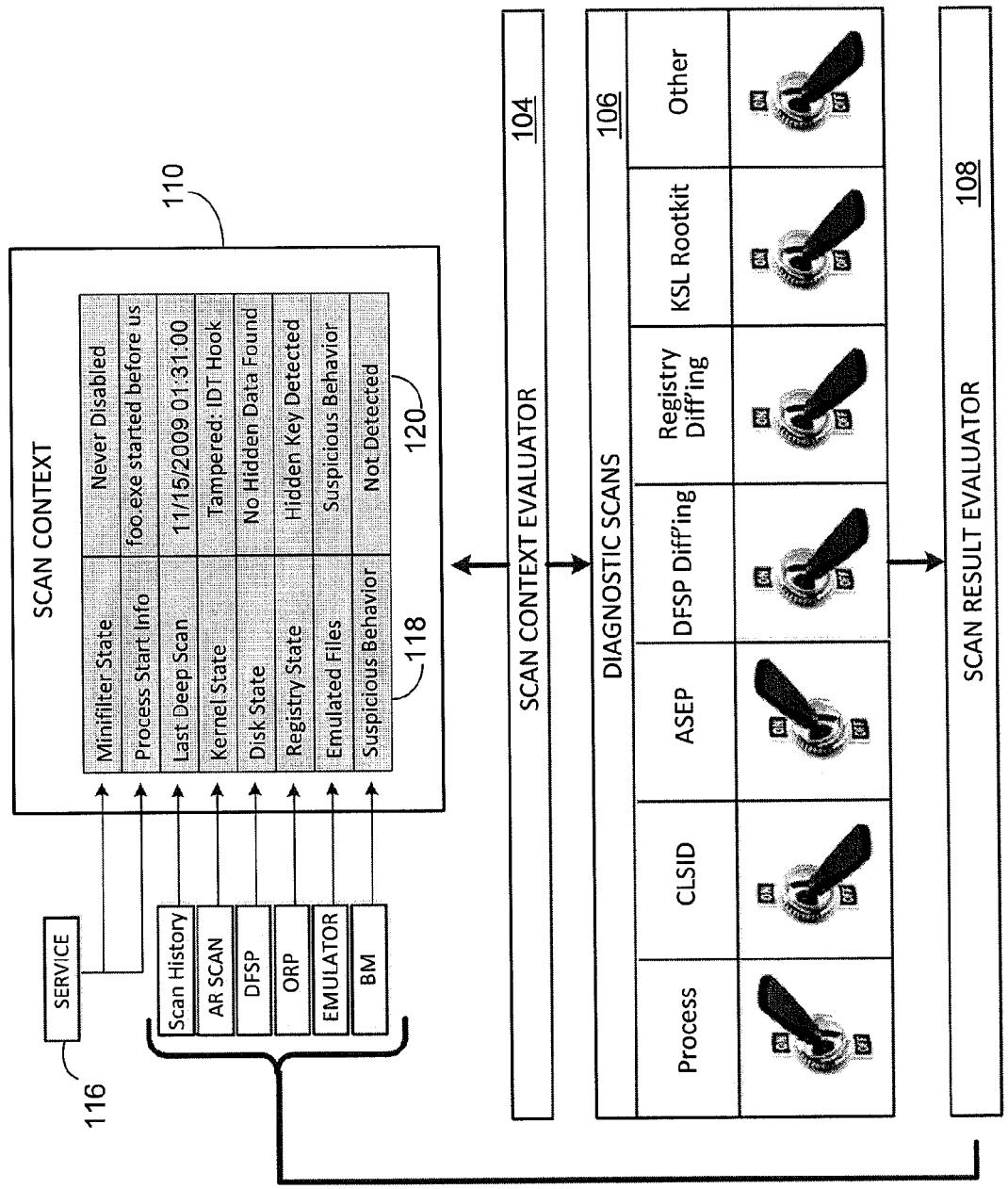

Any of a number of individual scans may be selectively enabled based upon an evaluation of the scan context, and the invention is not limited to the use of any particular scan type(s) or the use of any particular context information for triggering the enablement of such scan(s). FIGS. 3 and 4 are functional block diagrams showing illustrative examples of individual scan types that may be selectively enabled in some embodiments, as well as examples of scan context information that may be examined to determine whether such scans should be enabled or disabled. The illustrated examples of scan types and triggering mechanism are not, however, intended to be limiting.

As shown in FIG. 3, in some embodiments, a class ID (CLSID) scan (i.e., scanning CLSID's in the registry) may be enabled, for example, only if an examination of the scan context reveals that real-time protection (RTP) has not been continuously protecting the computer system since the last scan. If, for example, it is determined (based upon an evaluation of the scan history information in the scan context store 110) that RTP has been protecting the computer system since the last scan, without a window in which RTP was not running, the scan context evaluation module 104 may determine that there is no compelling reason to enumerate and scan the CLSIDs in the registry. Since RTP will generally ensure that threats are detected by scanning related user-mode binaries and CLSIDs will generally be covered by other auto-start execution points (ASEPs), a decision may, for example, be made to avoid expensive CLSID scanning.

In some embodiments, one or more diagnostic scans in addition to or in lieu of CLSID scanning may additionally or alternatively be selectively enabled. In the illustrative example shown in FIG. 4, for example, the diagnostic scans module 106 allows for the selective enabling of (1) process scanning, (2) CLSID scanning, (3) ASEP scanning, (3) direct file system parsing (DFSP) diff'ing (i.e., comparing differences between what is determined to exist and what the operating system shows to exist), (4) registry diff'ing, (5) engine kernel support library (KSL) rootkit scanning, and (5) "other" scans (e.g., a full disk scan, an offline scan, etc.).

It can be appreciated that, in some embodiments, the diagnostic scan approach discussed herein may provide significant flexibility. For example, in some circumstances, although a determination may be made to enable all scans, the decision to do so may made intelligently based upon the state information contained in the scan context store 110. Certain scans, e.g., an on-box offline scan solution or an automated PXE boot to offline scan, may take the system offline for as long as several hours, but with the benefit of an extremely thorough and safe scan. Such a diagnostic scan may, for example, be reserved for extreme cases where an evaluation of the scan context reveals that malware may be interfering with the performance of other scans. As a less extreme example, a comprehensive raw disk scanning and diff'ing may be enabled only if an evaluation of the scan context reveals certain kernel hooks consistent with techniques used to avoid detection by rootkits.

By disabling certain time consuming scans that are determined to be unnecessary due to the system state, the time that would otherwise be devoted to such unnecessary scans may, in some embodiments, be devoted to more useful checks. For example, scanning of user-mode CLSIDs or ASEPs may be disabled if an evaluation of the scan context reveals that a real-time minifilter has not been disabled since the last scan. In such a circumstance, the scan context evaluation module 104 may, for example, enable diagnostic scans that complement the coverage achieved from real-time protection afforded by the minifilter, such as registry diff'ing and direct file system parsing.

It should be appreciated that some diagnostic scans may provide some inherent risk to system stability. Loading a kernel-mode driver to read kernel-memory in order to scan for low-level rootkits is one example. Such a scan may be enabled, for example, only if examination of the scan context reveals symptoms of a rootkit, e.g., as determined by certain user-mode scans. With a diagnostic scan model such as that described herein, such inherently risky scans need not be performed on those computer systems that don't show any signs of infection.

In some embodiments, the determination of which individual scans to enable may additionally or alternatively depend on whether the scan is user-initiated or scheduled or any number of other factors.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method, the method comprising:
    evaluating a scan context of a computer system during a system scan, the scan context including state information associated with health of the computer system, the scan context including one or more of a current state or a previous state of the health of the computer system;
    based on results of the evaluation, configuring a first set of diagnostic scans to perform on the computer system during the system scan;
    performing the first set of diagnostic scans;
    updating the scan context with results of the first set of diagnostic scans; and
    evaluating the updated scan context to determine one or more additional diagnostics scans to perform during the system scan.

2. The method of claim 1, wherein evaluating the scan context further comprises
    evaluating the scan context against a set of known rules to determine whether a particular type of diagnostic scan is warranted.

3. The method of claim 2, wherein the set of known rules is dynamically updated by a cloud service.

4. The method of claim 1, further comprising determining one or more of the diagnostic scans not to perform based on the evaluation of the updated scan context.

5. The method of claim 1, wherein updating the scan context further comprises including information concerning a state of at least one application associated with the computer system.

6. The method of claim 1, wherein updating the scan context further comprises including
state information determined by a cloud service based upon an evaluation of at least one scan result.

7. The method of claim 1, further comprising:
modifying the scan context to include state information determined by a cloud service based upon information not available on the computer system.

8. At least one computer memory encoded with instructions that, when executed by one or more processors, cause the one or more processors to perform a method of evaluating a computer system, the method comprising:
evaluating a scan context of a computer system during a system scan, the scan context including state information associated with health of the computer system, the scan context including one or more of a current state or a previous state of the health of the computer system;
based on results of the evaluation, configuring a first set of diagnostic scans to perform on the computer system during the system scan;
performing the first set of diagnostic scans;
updating the scan context with results of the first set of diagnostic scans; and
evaluating the updated scan context to determine one or more additional diagnostics scans to perform during the system scan.

9. The at least one computer memory of claim 8, wherein evaluating the scan context further comprises evaluating the scan context against a set of known rules to determine whether a particular type of diagnostic scan is warranted.

10. The at least one computer memory of claim 8, determining not to perform one or more of the diagnostic scans based on the evaluation of the updated scan context.

11. The at least one computer memory of claim 8, wherein updating the scan context includes a state of at least one application on the computer system.

12. The at least one computer memory of claim 8, wherein updating the scan context includes
modifying the scan context to include state information determined by a cloud service based upon an evaluation of at least one result of a diagnostic scan.

13. The at least one computer memory of claim 8, further comprising:
modifying the scan context to include state information determined by a cloud service based on health issues of other computer systems.

14. The at least one computer memory of claim 8, wherein the diagnostic scans may include at least one of a process scan, a class id (CLSID) scan, an auto-start execution point (ASEP) scan, a direct file system parsing (DFSP) scan, a registry scan, a rootkit scan, a full disk scan, or an offline scan.

15. A system, comprising:
a scan context store configured to store scan context information for a computer system, the scan context information including state information associated with health of the computer, the scan context including one or more of a current state or a previous state of the health of the computer system; and
a software agent, residing on the computer system, configured to initiate a scan of the computer system, during execution of the scan, evaluate the scan context information in order to determine whether to adjust a level of diagnosis performed during the scan, to adjust the level of diagnosis based on the evaluation of the scan context information during the scan and to determine one or more additional diagnostics scans to perform during the scan, the scan including one or more diagnostic scans, the software agent comprising:
a scan context evaluator module configured to selectively enable respective diagnostic scans based upon the evaluation of the stored scan context information,
a diagnostic scans module configured to perform enabled ones of the respective diagnostic scans, and
a scan result evaluator module configured to modify the stored scan context information based upon results of the performed scans.

16. The system of claim 15, wherein the software agent comprises a scan context evaluator module configured to evaluate the scan context information against a set of known rules to determine whether a particular type of scan is warranted, and to enable the particular type of scan only if it is determined that the particular type of scan is warranted.

17. The system of claim 15, further comprising at least one application configured to modify the scan context information stored in the scan context store to include information concerning state of the at least one application.

18. The system of claim 15, the software agent further comprising a scan report module to generate a report of results upon completion of all diagnostic scans.

19. The system of claim 15, wherein the scan context information is stored in persistent storage.

* * * * *